US012673881B2

(12) United States Patent
McKee et al.

(10) Patent No.: US 12,673,881 B2
(45) Date of Patent: Jul. 7, 2026

(54) SURFACE WATER CLEANING SYSTEMS AND METHOD OF THEIR USE

(71) Applicant: KAI PONO SOLUTIONS, INC., Encinitas, CA (US)

(72) Inventors: Navy Sioux McKee, Norco, CA (US); Daniel Robert McKee, Wailuku, HI (US); Bailey Theadore Schantz, San Diego, CA (US); Jackson Coghlin Dickson, Mill Valley, CA (US); Edward Banuelos, Palmdale, CA (US)

(73) Assignee: KAI PONO SOLUTIONS, INC., Encinitas, CA (US)

( * ) Notice: Subject to any disclaimer, the term of this patent is extended or adjusted under 35 U.S.C. 154(b) by 605 days.

(21) Appl. No.: 17/891,364

(22) Filed: Aug. 19, 2022

(65) Prior Publication Data

US 2023/0054583 A1 Feb. 23, 2023

Related U.S. Application Data

(60) Provisional application No. 63/234,939, filed on Aug. 19, 2021.

(51) Int. Cl.
| | |
|---|---|
| *C02F 1/28* | (2023.01) |
| *C02F 103/00* | (2006.01) |
| *E03F 5/04* | (2006.01) |

(52) U.S. Cl.
CPC .............. *C02F 1/283* (2013.01); *E03F 5/041* (2013.01); *C02F 2103/001* (2013.01)

(58) Field of Classification Search
None
See application file for complete search history.

(56) References Cited

U.S. PATENT DOCUMENTS

| | | | | | |
|---|---|---|---|---|---|
| 63,284 | A | * | 3/1867 | Miller | ................... E03F 5/0404 |
| | | | | | 210/163 |
| 355,330 | A | * | 1/1887 | Locke | ................... E01C 11/223 |
| | | | | | 138/108 |
| 543,740 | A | * | 7/1895 | Kuhns | ................... E03F 5/0404 |
| | | | | | 210/163 |
| 630,533 | A | * | 8/1899 | Fiske | ................... A01K 1/0151 |
| | | | | | 119/528 |
| 814,308 | A | * | 3/1906 | Marriott | ................. E03F 5/046 |
| | | | | | 404/4 |
| 1,479,651 | A | * | 1/1924 | Clements | ................ E01F 9/541 |
| | | | | | 404/9 |
| 2,182,795 | A | * | 12/1939 | Day | ...................... E03F 5/0404 |
| | | | | | 210/434 |
| 2,701,027 | A | * | 2/1955 | Scoville | ................ E03F 5/0401 |
| | | | | | 220/DIG. 25 |

(Continued)

FOREIGN PATENT DOCUMENTS

RU 2404137 C1 11/2010

*Primary Examiner* — Robert J Popovics

(74) *Attorney, Agent, or Firm* — DUANE MORRIS LLP

(57) ABSTRACT

Provided herein are systems and methods for cleaning surface water streams. More specifically, surface water is cleaned using the systems and methods described herein wherein the surface water cleaning system comprises sequential aligned basins which are configured to direct water flow through one or a series of filter media such that the filtered water stream is reduced in organic chemicals and/or particles.

14 Claims, 16 Drawing Sheets

(56) References Cited

U.S. PATENT DOCUMENTS

| | | | | |
|---|---|---|---|---|
| 2,938,437 | A * | 5/1960 | Daley | E03F 5/046 |
| | | | | 285/125.1 |
| 3,393,614 | A * | 7/1968 | Peletz | E01C 11/223 |
| | | | | 404/4 |
| 3,626,823 | A * | 12/1971 | Toth | E01C 11/223 |
| | | | | 405/36 |
| 3,788,756 | A * | 1/1974 | Ito | E01D 19/086 |
| | | | | 404/4 |
| 4,136,010 | A * | 1/1979 | Pilie | E03F 5/0401 |
| | | | | 210/164 |
| 5,133,619 | A * | 7/1992 | Murfae | B01D 24/12 |
| | | | | 404/5 |
| 5,409,602 | A * | 4/1995 | Sorenson | E04D 13/0767 |
| | | | | 52/12 |
| 5,529,436 | A * | 6/1996 | Meyers | E03F 3/046 |
| | | | | 405/118 |
| 6,170,095 | B1 * | 1/2001 | Zars | E04H 4/1236 |
| | | | | 4/507 |
| 6,797,162 | B2 * | 9/2004 | Happel | E03F 1/00 |
| | | | | 210/163 |
| 6,941,703 | B2 * | 9/2005 | MacLean | E04F 19/10 |
| | | | | 4/612 |
| 6,974,540 | B1 * | 12/2005 | Fleischmann | E03F 1/00 |
| | | | | 210/163 |
| 7,083,721 | B2 * | 8/2006 | McClure | E03F 1/00 |
| | | | | 210/162 |
| 7,132,045 | B1 * | 11/2006 | Trangsrud | E03F 5/0404 |
| | | | | 210/474 |
| 7,264,418 | B1 * | 9/2007 | Houck | E03F 3/046 |
| | | | | 405/47 |
| 7,309,420 | B1 * | 12/2007 | Trangsrud | E03F 1/00 |
| | | | | 210/170.03 |
| 7,494,585 | B2 * | 2/2009 | Nino | E03F 1/00 |
| | | | | 210/767 |
| 7,785,464 | B2 * | 8/2010 | Happel | C02F 1/56 |
| | | | | 210/170.03 |
| 8,240,946 | B2 * | 8/2012 | Applefield | E01C 11/227 |
| | | | | 405/36 |
| 8,323,485 | B2 * | 12/2012 | Blundell | E03F 1/002 |
| | | | | 210/170.03 |
| 8,366,923 | B1 * | 2/2013 | Happel | E03F 5/14 |
| | | | | 210/170.03 |
| 8,877,048 | B1 | 11/2014 | Owings | |
| 9,127,446 | B2 * | 9/2015 | Schlueter | E03F 5/04 |
| 9,359,746 | B1 * | 6/2016 | Amend | E03F 5/101 |
| 9,718,008 | B2 * | 8/2017 | Peresan | B01D 33/0346 |
| 9,903,105 | B2 * | 2/2018 | Tomberlin | E03F 5/0411 |
| 10,017,933 | B1 * | 7/2018 | Kirby | E03F 5/0408 |
| 10,047,511 | B2 * | 8/2018 | Eftekharzadeh | E03B 11/10 |
| 10,052,570 | B2 * | 8/2018 | Braun | B01D 21/2483 |
| 10,060,117 | B1 * | 8/2018 | Marshall | E03F 5/0402 |
| 10,240,332 | B1 * | 3/2019 | Stetson | E02B 11/005 |
| 10,287,769 | B2 * | 5/2019 | Fink | B01D 21/0012 |
| 10,294,651 | B2 | 5/2019 | Dannrup | |
| 10,334,839 | B2 | 7/2019 | Deurloo | |
| 10,384,155 | B1 * | 8/2019 | DiLalla | E03F 5/0404 |
| 10,400,436 | B2 * | 9/2019 | Steylaerts | E03C 1/284 |
| 10,434,442 | B2 * | 10/2019 | Peresan | B01D 33/03 |
| 10,570,604 | B2 * | 2/2020 | McInnis | B01D 29/13 |
| 10,753,077 | B2 * | 8/2020 | Coppola | C02F 1/004 |
| 10,786,765 | B2 * | 9/2020 | DiLalla | B01D 29/27 |
| 10,882,772 | B1 * | 1/2021 | Wensel | E03F 5/101 |
| 11,015,331 | B1 * | 5/2021 | Kang | E03F 5/04 |
| 11,312,647 | B1 * | 4/2022 | Wensel | E03F 5/0404 |
| 11,346,094 | B2 * | 5/2022 | Lee | B01D 35/1435 |
| 11,459,744 | B2 * | 10/2022 | Swope | C02F 1/001 |
| 11,629,085 | B1 * | 4/2023 | Wensel | C02F 9/00 |
| | | | | 210/170.03 |
| 11,877,573 | B2 * | 1/2024 | Friezner | E03F 1/002 |
| 11,974,526 | B2 * | 5/2024 | McClain | A01G 25/00 |
| 11,980,835 | B2 * | 5/2024 | Zarraonandia | B01D 29/33 |
| 12,134,886 | B2 * | 11/2024 | Coppola | C02F 1/004 |
| 12,215,493 | B1 * | 2/2025 | Lawrence | E03F 1/002 |
| 12,276,098 | B1 * | 4/2025 | Chittoor | E03F 5/0404 |
| 12,534,899 | B2 * | 1/2026 | Swanson | E03F 5/06 |
| 12,546,102 | B2 * | 2/2026 | Corona | E01C 11/227 |
| 2003/0132150 | A1 * | 7/2003 | Happel | E03F 1/00 |
| | | | | 210/163 |
| 2003/0136717 | A1 * | 7/2003 | Tseng | E03F 5/0404 |
| | | | | 210/163 |
| 2004/0079040 | A1 * | 4/2004 | MacLean | A01K 1/0103 |
| | | | | 52/302.1 |
| 2005/0100409 | A1 * | 5/2005 | Houck | E03F 3/046 |
| | | | | 405/125 |
| 2006/0239773 | A1 * | 10/2006 | Meyers | E01C 11/227 |
| | | | | 404/2 |
| 2007/0261166 | A1 * | 11/2007 | Burns | E03C 1/22 |
| | | | | 4/665 |
| 2009/0127176 | A1 | 5/2009 | Cummins | |
| 2009/0145829 | A1 * | 6/2009 | Happel | E03F 5/0401 |
| | | | | 210/170.03 |
| 2009/0241442 | A1 * | 10/2009 | MacLean | A01K 1/0151 |
| | | | | 52/302.1 |
| 2012/0097617 | A1 * | 4/2012 | Blundell | E03F 5/0404 |
| | | | | 210/170.03 |
| 2012/0198778 | A1 * | 8/2012 | MacLean | E04F 17/00 |
| | | | | 52/302.1 |
| 2012/0288330 | A1 * | 11/2012 | Altinier | E01C 11/227 |
| | | | | 405/43 |
| 2013/0015123 | A1 * | 1/2013 | Torres-Collazo | |
| | | | | B01D 21/2483 |
| | | | | 210/522 |
| 2013/0228527 | A1 * | 9/2013 | Crasti | C02F 1/004 |
| | | | | 210/170.03 |
| 2016/0340889 | A1 * | 11/2016 | Tomberlin | E03F 5/0404 |
| 2017/0314252 | A1 * | 11/2017 | Steylaerts | E03F 5/0408 |
| 2018/0245328 | A1 * | 8/2018 | Marshall | E03F 5/046 |
| 2019/0024358 | A1 * | 1/2019 | Meincke | E01C 11/223 |
| 2022/0023778 | A1 * | 1/2022 | Zarraonandia | C02F 1/001 |
| 2022/0349170 | A1 * | 11/2022 | McKnight | E03F 5/0404 |
| 2023/0054583 | A1 * | 2/2023 | McKee | E03F 5/041 |
| 2023/0322582 | A1 * | 10/2023 | Ridell | G01N 33/18 |
| | | | | 210/600 |
| 2024/0191492 | A1 * | 6/2024 | Swanson | E03F 5/06 |
| 2025/0129592 | A1 * | 4/2025 | Peters, Jr. | E03F 5/0404 |

* cited by examiner 260, 270

20

SURFACE WATER CLEANING SYSTEMS AND METHOD OF THEIR USE

RELATED APPLICATIONS

This application claims priority to U.S. Provisional Application No. 63/234,939, filed Aug. 19, 2021, the contents of which is herein incorporated by reference in its entirety.

FIELD

This disclosure relates to the field of cleaning surface runoff water. More specifically, this disclosure relates to using a system comprising a basin placed within a gutter to clean surface runoff water to reduce the exposure of contaminated water to a water sewage system.

BACKGROUND

Water runoff is the excessive surface runoff of rainwater, melted snow or ice, wash water or similar from different types of surfaces, or overflow water from excessive irrigation. Such surfaces can be parking lots, sidewalks, roofs, lawns, and similar surfaces. Water runoff can comprise soluble or insoluble oil, heavy metals, trash, fertilizers, pesticides, plastic or tire rubber particles, and other pollutants. During rain or excessive irrigation, water runoff can transport contaminated surface water in a gutter to storm drains. Storm drains can be connected to a drainage system for discharge into receiving surface waters, such as a canal, river, lake, reservoir, sea, ocean, community water treatment plant, or other surface water. Unfortunately, when contaminated surface water is presented to a storm drain without purification or treatment, said pollution enters the environment resulting in deleterious environmental effects.

Runoff water typically traverses in a gutter while following the path of gravity towards a sewer. Gutters typically comprise an impermeable material, such as concrete and/or asphalt. Storm drains typically include a heavy metal grate to filter out course solids before entering the storm drain, although many municipalities do not even maintain the storm drain grate so as to periodically clear said grate of filtered course debris.

While methods exist for filtering surface water runoff before presentation to a storm drain to reduce levels of pollution, none are adequate for long term durability with minimal maintenance. For example, U.S. Pat. No. 10,294,651 refers to a floating filtering device placed under a sewer grate which is configured to float at the water level and filters said water of small particles and chemicals while under the sewer grate. Maintenance of the filtering device, however, requires periodic removal of the sewer grate and extraction of the filtering device from the sewer tube. Also, during periods of high water flow, the filtering device may clog the water line, resulting in flooding. U.S. Pat. No. 8,877,048 refers to a heavy debris and sediment removal system from surface water runoff comprising stair stepping basins configured to be have each of the separate basins at different elevations, but does not identify the exact filtering material used. U.S. Pat. No. 10,334,839 refers to a system comprising a metal catch basin which includes two trap openable doors located on the bottom and top of the system. The described catch basin is also designed to fit into an existing storm drain and catch solids before entering the existing outflow. Russia patent number RU2404137 refers to a water filtration system comprising stepped basins using vegetation and aeration to remove chemical pollutants from a water stream, but provides no basis for periodic removal of saturated chemical pollutant filtration media or a method of removing solids debris. U.S. patent publication No. US 2009/0127176 refers to a system comprising separate tanks with water running though one tank, through a small pipe and into the next tank in order to be filtered, with a closed design in which water will be almost completely enclosed and isolated within the system during the filtration and treatment step. As such, it does not enable continuous water purification but instead, stuttered, periodic steps of water treatment.

In light of the above, there remains a need for a water treatment system and methods that allow for continuous water filtration and treatment. It is even more desirable that the method will not involve permanent fixed subsystems which remove chemical pollutants as their periodic removal enables for isolation of chemical pollutants for processing in a workflow separate from the water filtering system.

SUMMARY

The inventions described and claimed herein have many attributes and aspects including, but not limited to, those set forth or described or referenced in this Summary. It is not intended to be all-inclusive and the inventions described and claimed herein are not limited to or by the features or embodiments identified in this Summary, which is included for purposes of illustration only and not restriction.

This disclosure provides for methods, and systems, related to cleaning contaminated water.

In some aspects, this disclosure provides for a system for cleaning surface water, comprising:

at least one basin, each basin can independently comprise:
a top open surface which is configured to receive water, a first side and a second side wherein the first side is approximately parallel with the second side, a front side and a rear side wherein the front side is approximately parallel with the rear side, a bottom basin surface, a basin exit port, a first panel positioned between the front side of the basin and a midpoint between the rear side and the front side of the basin and wherein the first panel begins at the top open surface and extends partially downwards towards the bottom basin surface and traverses a width of the entire basin, a second panel positioned between the rear side of the basin and the midpoint of the basin and wherein the second panel begins at the top surface and extends partially downwards towards the bottom basin surface and traverses the width of the entire basin, a third panel positioned at the midpoint of the basin and which begins at the bottom basin surface and extends partially upwards and traverses the width of the entire basin, a first water purification device comprising a porous structure and wherein the first water purification device is located between the first panel and the front side of the basin, and a second water purification device comprising a porous structure and wherein the second water purification device is located between the third panel and the second panel; and a discharge pipe in fluidic communication with each of the at least one basin exit port and a surface water catch basin. the third panel protrusion.

In some aspects, the at least one basin can comprise a first basin and a second basin, wherein the front side of the first basin comprises a first cutout and the rear side of the second basin comprises a second cutout, and wherein the first cutout is in fluidic communication with the second cutout.

In some aspects, the at least one basin can further comprise a main discharge pipe that is in fluidic communication with a main exit port and the surface water catch basin, wherein the second basin rear side further comprises the main exit port.

In some aspects, the first or second water purification device of one of the at least one basin can comprise a filter media.

In some aspects, the filter media can be selected from: activated carbon filter, catalytic carbon filter, KDF (Kinetic Degradation Fluxion), polypropylene foam, PVC foam, activated aluminum, manganese dioxide, or combinations thereof. In some aspects, the KDF comprises copper and zinc particles. In some aspects, the basin can further comprise one or a plurality of filter media balls. The filter media balls can comprise activated carbon, catalytic carbon, polypropylene, or polyvinylchloride.

In some aspects, the basin can further comprise a grate which is configured to be positioned on top of the top open surface and thereby encloses the basin.

In some aspects, this disclosure provides for a method of reducing chemical pollutants in a water stream, the method comprising contacting a contaminated water stream with a system of cleaning water as described herein. In some aspects, the water stream can be from street water runoff.

BRIEF DESCRIPTIONS OF DRAWINGS

The drawings form part of the present specification and are included to further demonstrate certain aspects of the embodiments described herein. These embodiments may be better understood by reference to one or more of the following drawings in combination with the detailed description.

DETAILED DESCRIPTION

Figure 1:
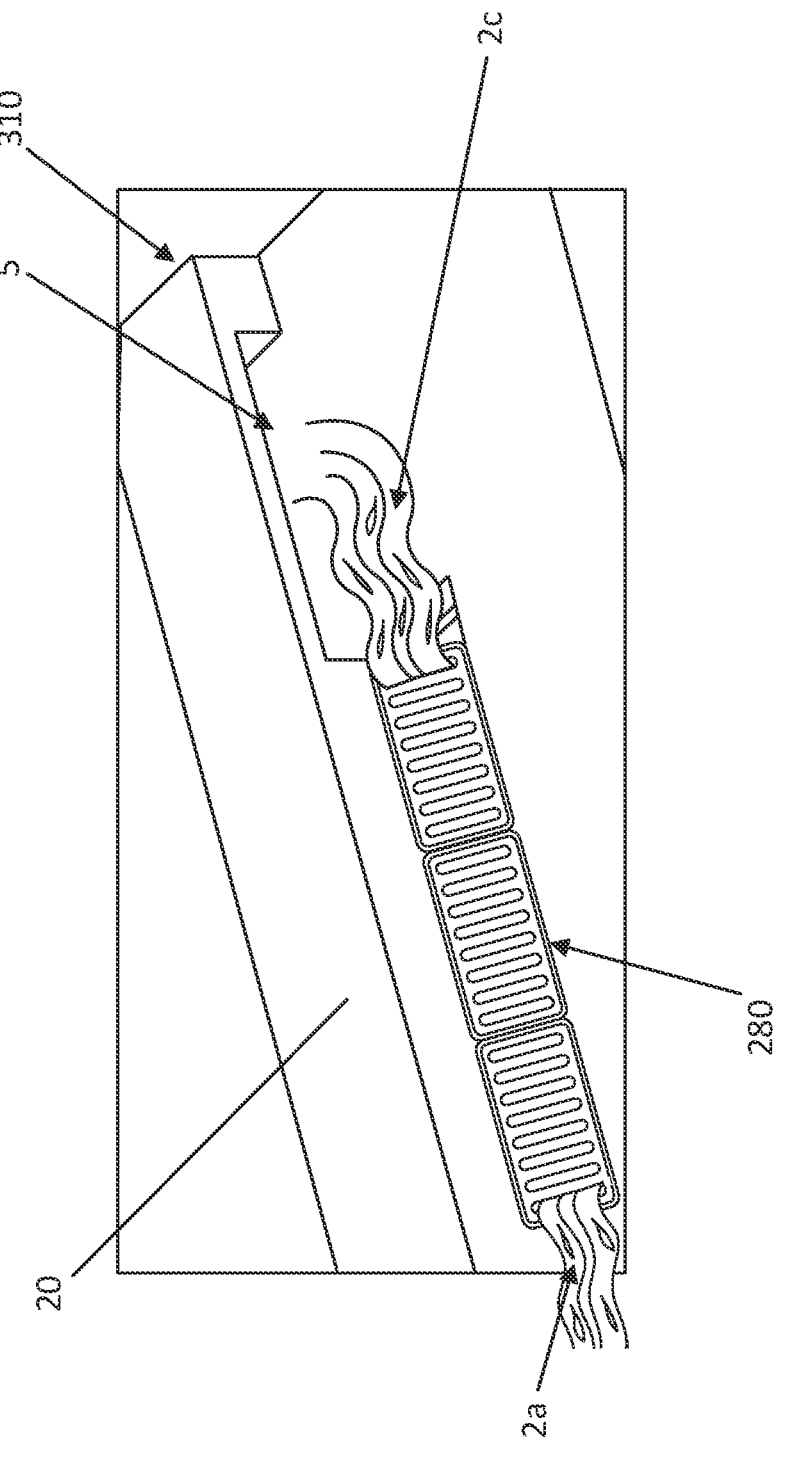
FIG. 1 depicts one embodiment of the surface water cleaning system 20.

This description of the exemplary embodiments is intended to be read in connection with the accompanying drawings, which are to be considered part of the entire written description. The drawings are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Throughout the description and claims of this invention, the word "comprise" and variations of the word, such as "comprising" and "comprises," means "including but not limited to," and is not intended to exclude, for example, other component and steps. "Exemplary" means "an example of" and is not intended to convey an indication of a preferred or ideal embodiment. "Such as" is not used in a restrictive sense, but for explanatory purposes.

Disclosed herein are components that can be used to perform the disclosed methods and systems. The combinations, subsets, interactions, groups, etc. of these and all other components, with their collective combinations and permutation may not be explicitly disclosed for all systems and associated methods. This applies to all aspects of this application including, but not limited to, steps in disclosed methods. Thus, if there are a variety of additional steps that can be performed it is understood that each of these additional steps can be performed with and specific embodiment or combination of embodiments of the disclosed methods and systems.

Terms such as "first" and "second", and other numerical terms, when used herein, do not imply a sequence or order unless clearly indicated by the context. For example, a "first panel" and a "second panel" do not intend to refer to one panel is before, or primary to, or directly next to another panel.

In some embodiments, this disclosure provides for a form of an entirely hardware embodiment, an entirely software embodiment, or an embodiment combining software and hardware aspects. In some embodiments, this disclosure includes a combination of physical components configured to perform certain steps and functions that are controlled by a combination of hardware and software components.

Definitions

As used herein, the recitation of a numerical range for a variable is intended to convey that the invention may be practiced with the variable equal to any of the values within that range. Thus, for a variable that is inherently discrete, the variable can be equal to any integer value of the numerical range, including the end-points of the range. Similarly, for a variable, which is inherently continuous, the variable can be equal to any real value of the numerical range, including the end-points of the range. As an example, a variable which is described as having values between 0 and 2, can be 0, 1 or 2 for variables which are inherently discrete, and can be 0.0, 0.1, 0.01, 0.001, or any other real value, for variables which are inherently continuous.

As used herein, the term "surface water" refers to water from excessive irrigation, storm water, spillage that traverses a street or gutter towards a sewer system, or any other source of water that could potentially enter a gutter. The surface water is commonly contaminated surface water 2a, which when it enters the surface water cleaning system of this disclosure converts into process surface water 2b, and exits the surface water cleaning system through the discharge pipe 240 as cleaned surface water 2d, or if the surface water cleaning system is saturated, exits as overflow cleaned surface water 2c.

As used herein, the term "contaminated water" refers to surface water which comprises an agent which is biologically harmful and/or may reduce the operation of a municipal water treatment facility. In some embodiments, the biologically harmful agent can be an oil (e.g., car oil), gasoline, pesticide, herbicide, urine, feces, industrial wastewater, etc. In some embodiments, the agent which can reduce the operation of a municipal water treatment facility can be a rubber (e.g., tire rubber particle), sediment, rock, piece of plastic, rope, bag, etc.

As used herein, the term "filter mat" refers to a material which can reduce the concentration of solid particles, chemical pollutants, and/or biological species (e.g., viral or bacterial particles) in a water source. The filter mat is porous, and will have a porosity selected to be appropriate for the targeted particle size to be removed from the water source. In some embodiments, the filter mat can be a Matala Filter Media Pad, Aqua Flo Universal Pond Filter Mat, plastic mesh, porous foam pad, and the like from any commercial source.

The filter mat can be square, rectangular, round, oval, or polygonal in shape and conform to the shape defined by the first and second sides of the basin and the protrusions upon which the filter mat is in proximity.

As used herein, the term "filter media" refers to a material which can remove contaminants from a water source. The filter media can be selected from, in addition to any additional filter media, a filter mat, PS-DBV resin particles, activated carbon filter, catalytic carbon filter, KDF (Kinetic Degradation Fluxion), polypropylene foam, PVC foam, activated aluminum particles, manganese dioxide particles, greensand, silica, vermiculite, anthracite, calcite, crushed garnet, Manganese greensand, and clinoptilolite.

As used herein, the term "filter mat housing" refers to a porous housing that allows water to traverse through it. The filter mat can optionally be metal, injection molded plastic, concrete, or any other suitable material. In some embodiments, the filter mat housing is configured to encapsulate a filter mat or filter media. The filter mat may, in some embodiments, include a bolt hole which is configured to align with the position of the bolts and/or bolt holes in the surface water cleaning system along the protrusions so as to prevent the filter mat from becoming mobile as water traverses through said filter mat.

As used herein, the term "filter media ball" refers to a spherical-shaped plastic housing comprising polypropylene or activated carbon. The filter media ball can be mobile, thereby increasing the surface contact time with contaminated surface water with minimal reduction in the flow rate. The use of filter media balls to prevent significant reduction in the water flow rate allows for higher water cleaning rates than without the use of said filter media balls.

As used herein, the term "tight grain filter" refers to a porous housing comprising a filter media wherein contaminated surface water traverses through the tight grain filter resulting in a reduced concentration of pollutants. The tight grain filter gates water traversing through the tight grain filter such that only after the water has traversed through the filter mat and optionally filter media balls will the water traverse through the tight grain filter and proceed to the discharge pipe. The tight grain filter allows for water to pass through only after water has traversed through the filter mat and optionally filter media balls.

As used herein, the term "slotted grate" or "grate" refers to a framework which can be made of concrete, metal, or any other suitable material to prevent a human, animal, vehicle, or other large item from entering the basin of the surface water cleaning system. The distance and size of the pores of the grate will be determined by regional building and construction codes, and in some embodiments, can be from 1 to 1.5 inches wide and 1 to 1.5 inches long. A grate can support at least up to 40,000 pounds when placed upon a concrete support.

As used herein, the term "strainer device" refers to a grated, porous construct comprising a recession in which solid particles having an average diameter larger than the pore size of the material are retained. The strainer device can be metal, plastic, or any other suitable material to remove rocks and other solid debris from the surface water 2a.

As used herein, the term "cleaned water" or "clean" refers to water which was previously contaminated with pollutant or solid debris which has been reduced in concentration of said pollutant or solid debris by traversing the surface water cleaning system described herein.

As used herein, the terms "sewer system", "storm drain", and "sewer/storm system" are used interchangeably and refer to a water handling system installed by or at the direction of a municipality for transporting water to a water treatment plant or water outlet. In some embodiments, the water outlet is directly to a waterway (which can include or exclude an ocean, pond, lake, river, creek, or additional tubing system). The term "storm drain" are used in some regions which include a sewer system and a surface or sub-surface reservoir to store water before transport through an underground pipe system to a water treatment plant or water outlet.

Systems

Figure 9:
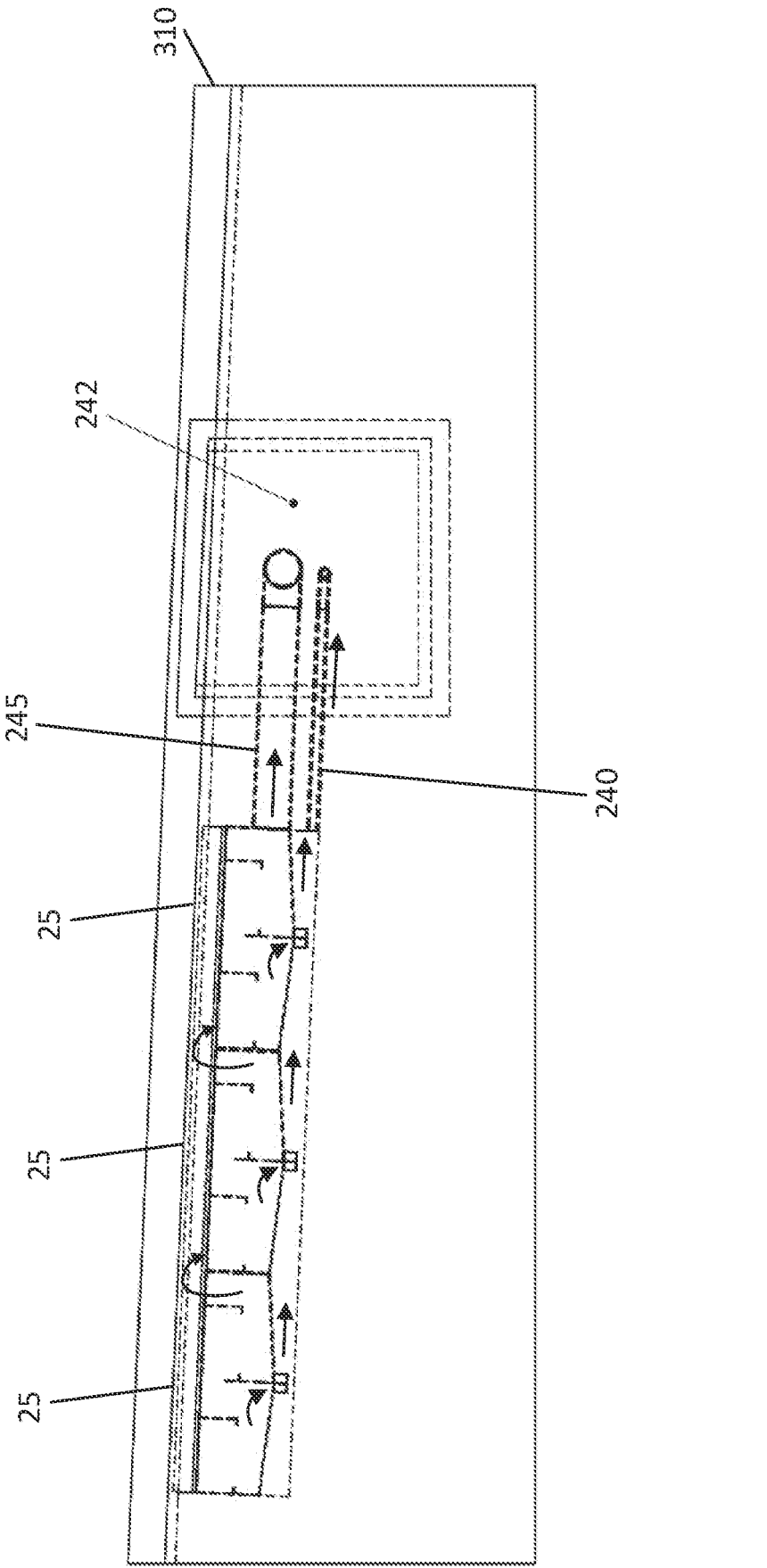
FIG. 9 is a side cutaway perspective transparent view of one embodiment of the surface water cleaning system 20.

FIG. 1 depicts one embodiment of the surface water cleaning system 20 configured aligned along a gutter line and proximal to a storm drain 5. FIG. 1 depicts the contaminated surface water 2a traversing the surface water cleaning system 20 and depositing into a surface water catch basin 242 (FIG. 9). In some embodiments, an overflow condition results in cleaned surface water 2c flowing out of the grates 280 and into the sewer drain 5 which may in turn flow into the surface water catch basin 242.

Figure 2:
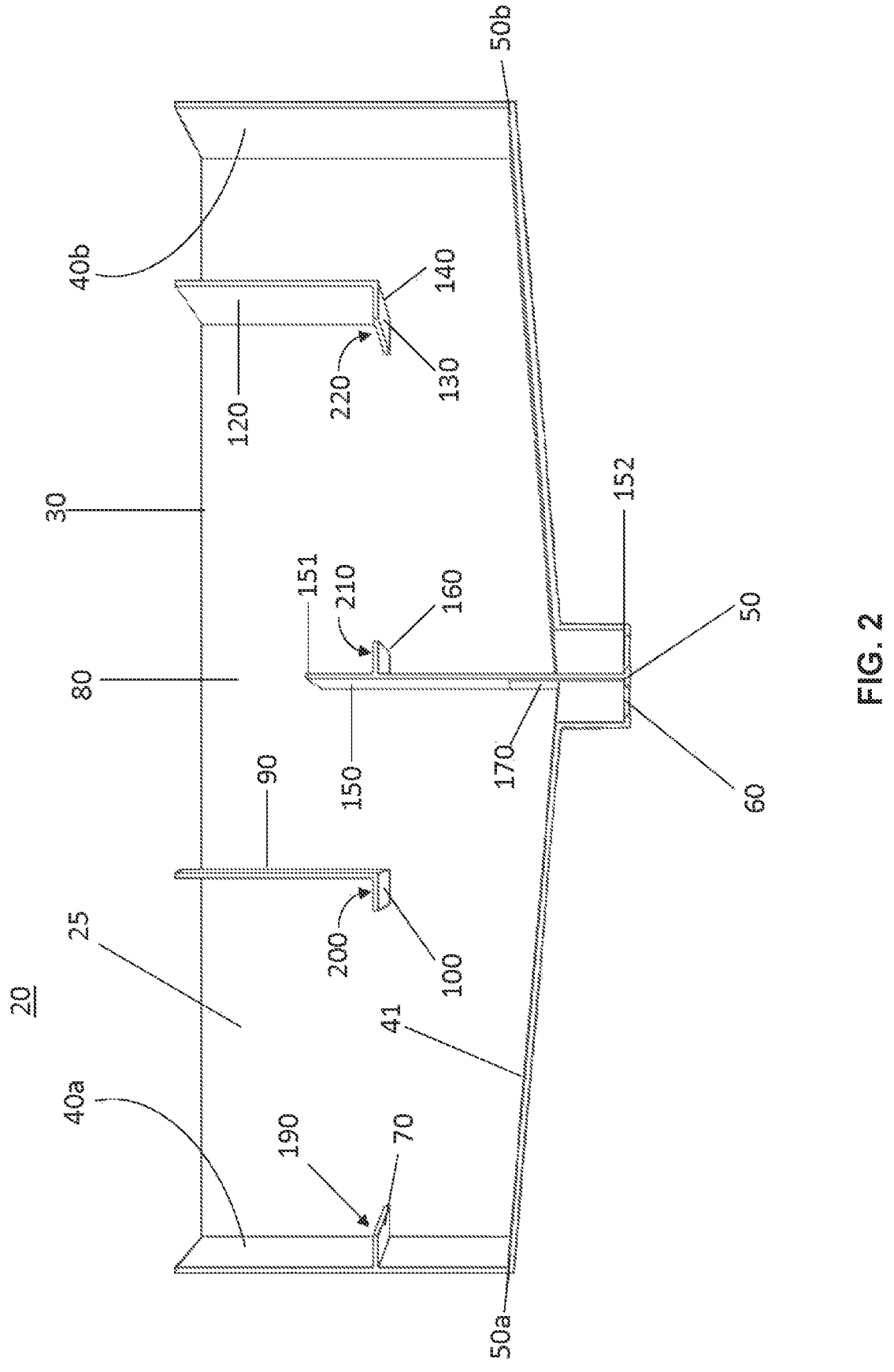
FIG. 2 depicts one embodiment of a basin 25.
Figures 3A, 3B:
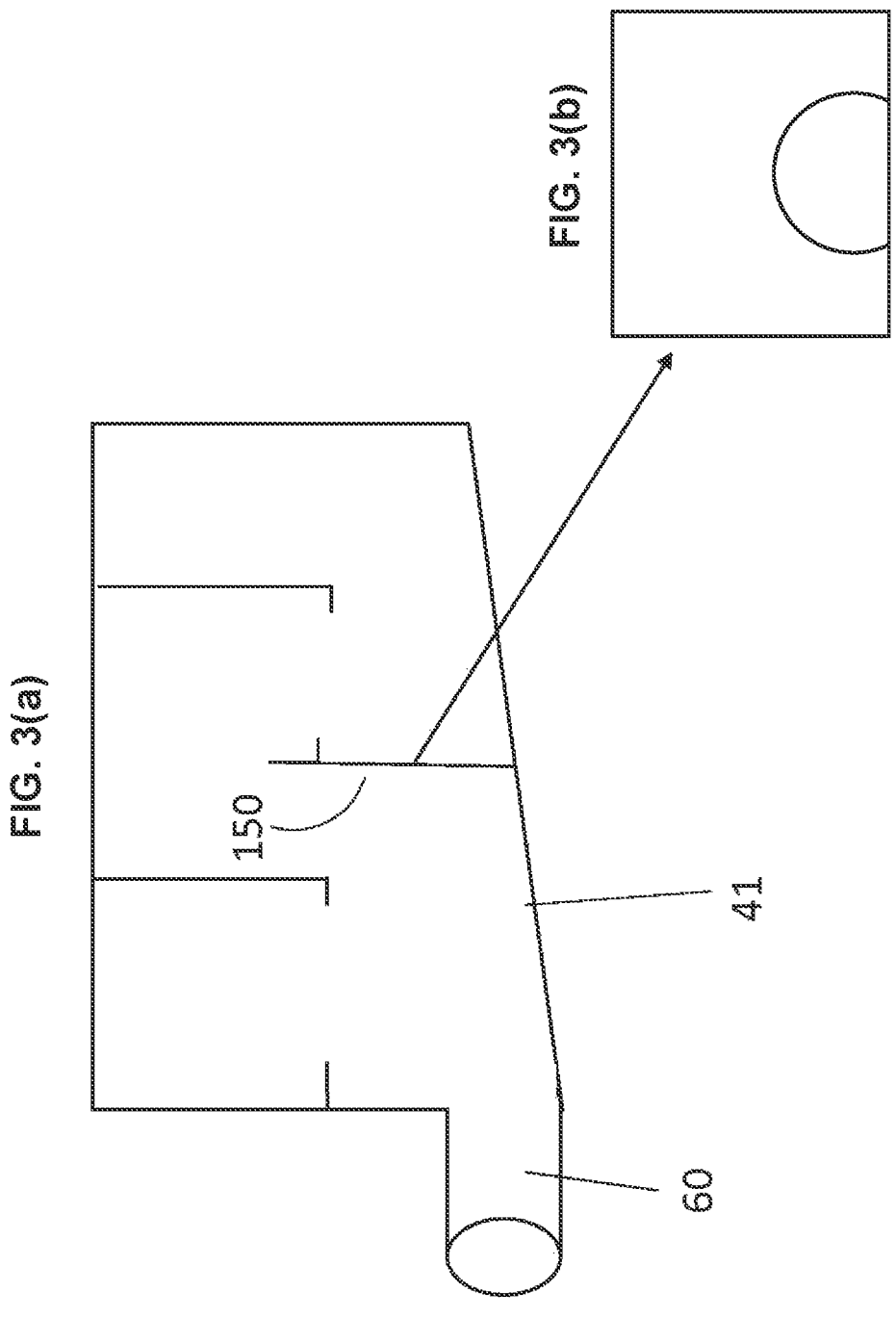
FIG. 3(a) depicts one embodiment of a basin 25.
FIG. 3(b) depicts one embodiment of the third panel 150.

The surface water cleaning system 20 comprises a basin 25 defined by a bottom surface 41 which may be continuous or discontinuous. In some embodiments, the basin comprises pBCPD (Polydicyclopentadiene) and built using plastic mold injection which results in a light weight easily replaceable surface water cleaning system 20. In some embodiments, as shown in FIG. 2, the bottom surfaces are discontinuous and parallel with two separate planes 50a, and 50b, which intersect at a single point or line in the direction of gravity 50. In some embodiments, as shown in FIG. 3(*a*), the bottom surface is continuous and tapers towards a single point. In some embodiments, the basin is further defined by a front side 40a and rear side 40b, shown in FIG. 2, and a first side 40c and second side 40d, shown in the top down view of FIG. 4. The basin also comprises an open top basin surface 30.

The front side 40a comprises a front side protrusion 70 which extends along the inner width of a first basin side towards the middle of the basin 80 and wherein the protrusion is positioned at a distance between the top basin surface 30 and the bottom basin surface 41. The front side protrusion comprises a top surface 190. The protrusion can be a bolt, a lip, a ledge, a hemisphere, or a hook. The purpose of the protrusions within the basin is to allow for a filter mat housing 275, shown in FIG. 5, to be positioned such that the filter mat housing 275 is not in contact with the bottom of the basin surface 41. In some embodiments, the protrusions within the basin further comprise one or more bolt holes 232 and bolts 230 configured to affix the filter mat housing to the protrusions within the basin, shown in FIG. 6. In some embodiments, the bolts are welded into the bolt hole, also shown in FIG. 6. The bolts may also traverse a portion of the filter mat housing while a corresponding nut is used to lock the filter mat housing into place. In other embodiments, nothing is used to attach the filter mat housing to the protrusions and the filter mat housing is held in place by gravity and/or the pressure from the process surface water 2b traversing the surface water cleaning system 20. Using flow pressure and gravity to hold the filter mat housing 275 in place allows for much easier periodic maintenance and replacement of the filter media located inside of the filter mat housing 275.

In some embodiments, each of the protrusions can be independently selected from a ledge, a hook, a hemisphere, or a cylinder protruding out from the surface of the panel. When the protrusions are a ledge, they can further comprise one or a plurality of bolt holes wherein a bolt and nut affix the first or second water purification means to the protrusion.

Figure 4:
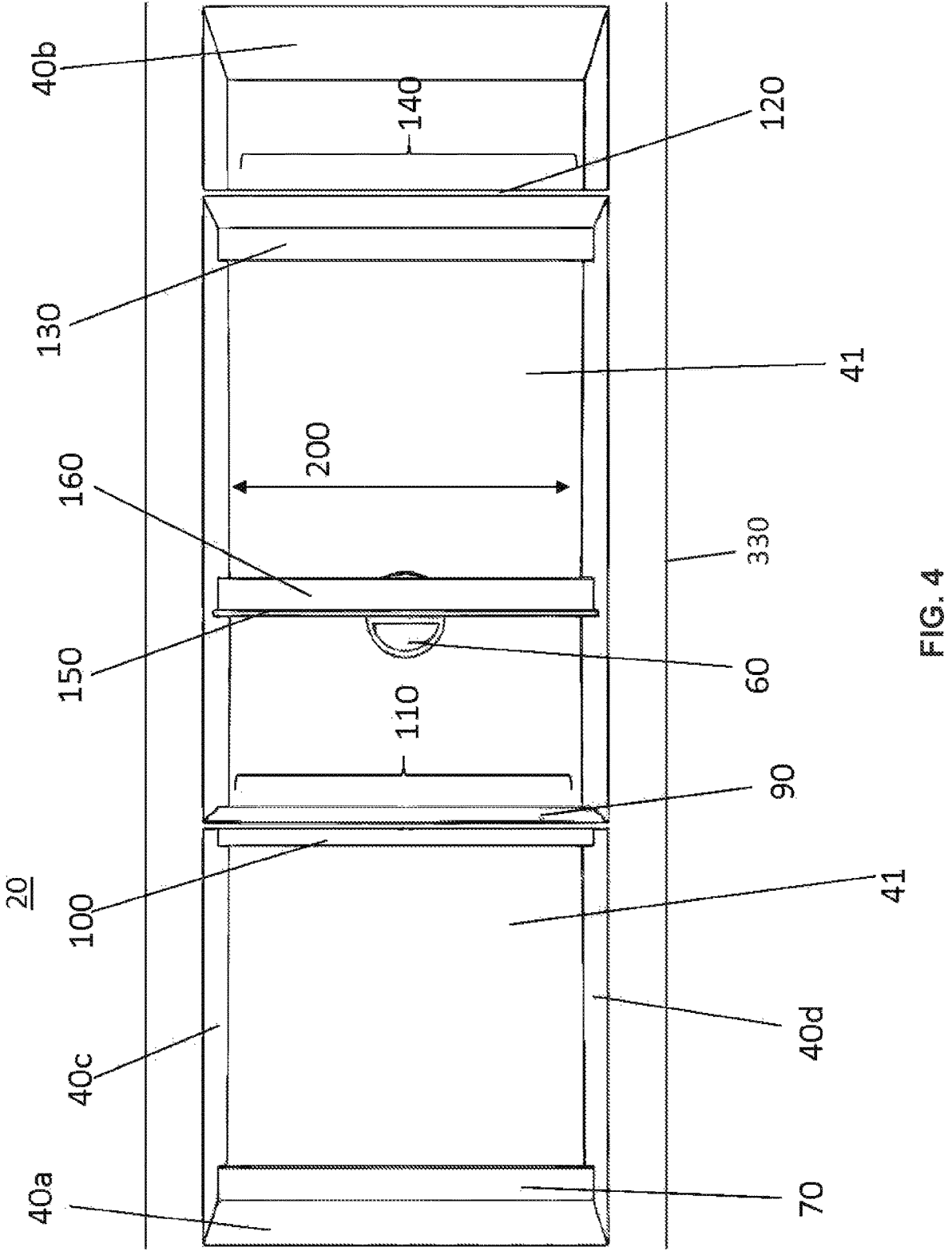
FIG. 4 is a top view of one embodiment of a basin 25.

The basin further comprises a first panel 90. The first panel 90 is positioned at a distance between the front side of the basin 40a and the middle of the basin 80, and is in approximate parallel configuration to the front 40a and rear 40b sides of the basin 25 and which begins from the top surface of the basin 30, extending partially downwards towards the bottom of the basin surface 41, as shown in FIG. 2, and traverses the width of the basin, as shown in FIG. 4. The first panel 90 further comprises a first panel protrusion 100 which extends along the bottom edge of the first panel 90 directed towards the front side of the basin 40a. The first panel protrusion 100 comprises a first panel protrusion top surface 200.

Figure 5:
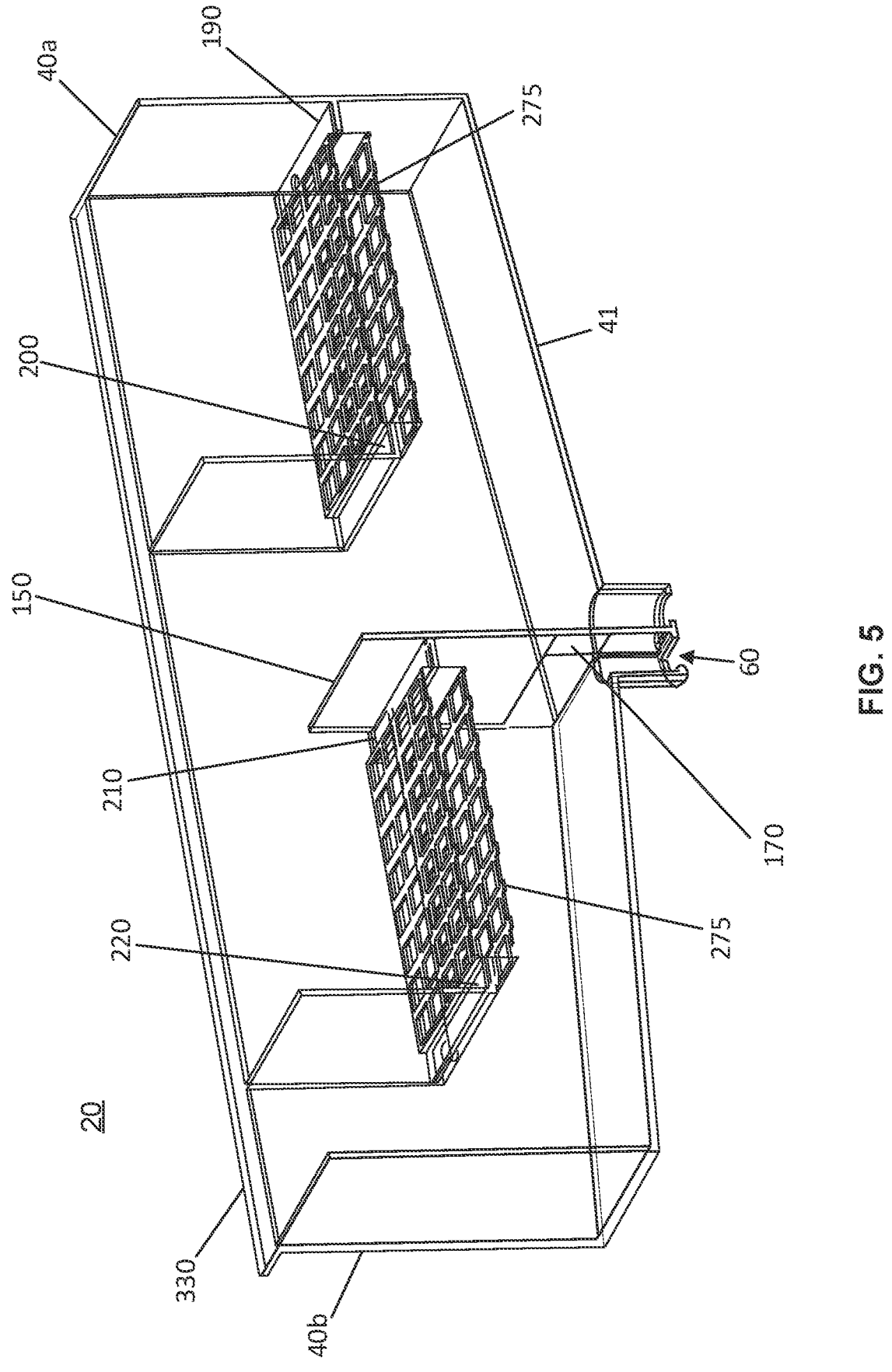
FIG. 5 is a side view of one embodiment of a basin 25.
Figure 6:
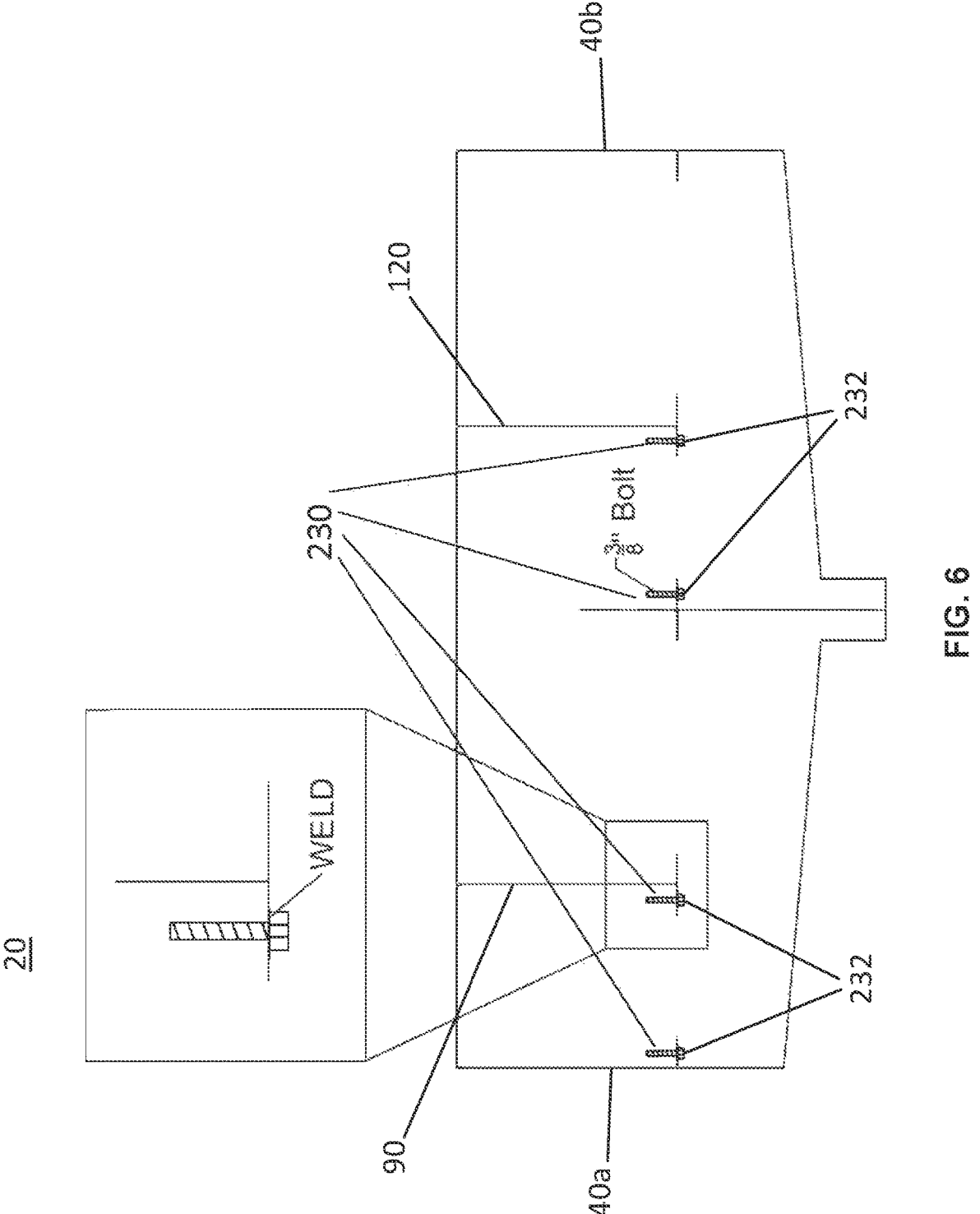
FIG. 6 depicts one embodiment of a basin 25.

The basin further comprises a second panel 120 positioned at a distance between the rear side of the basin 40b and the middle of the basin 80 and is in approximate parallel configuration to the front 40a and rear 40b sides of the basin and which begins from the top basin surface 30 extending partially downwards to bottom of the basin 41, as shown in FIG. 2, and traverses the width of the basin, as shown in FIG. 4. The second panel 120 further comprises a second panel protrusion 130 which extends along the bottom edge of the second panel 120 directed towards the middle of the basin 80. The second panel protrusion comprises a second panel top surface 220, upon which a filter mat housing 275 will be affixed, as shown in FIG. 5. The filter mat housing 275 may enclose a filter media, which can include a first filter mat 260 and/or a second filter mat 270.

The basin further comprises a third panel 150 positioned in the middle of the basin 80 and is in approximate parallel configuration to the front 40a and rear 40b sides of the basin 25, and which begins from the bottom surface of the basin 41, partially extending upwards to the top of the basin 30, as shown in FIG. 2, and traverses the width of the basin, as shown in FIG. 4. The third panel 150 further comprising a third panel protrusion 160 which is positioned between the top of third panel 151 and bottom of the third panel 152 and extends towards the second panel 120. The third panel protrusion comprises a third panel protrusion top surface 210. In some embodiments, the third panel 150 further comprises a hole 170 positioned at or near the bottom of the third panel. In some embodiments, shown in FIG. 3, the third panel comprises a hole, FIG. 3(b), which can be circular, semicircular, square, rectangular, or polygonal. A tight grain filter 250 may be housed in holes 170 and 150 to allow the process water 2b to flow through before it is discharged through the basin exit port 60. In another embodiment, where the basin exit port 60 is located on the first side 40c or the second side, the tight grain filter may optionally be housed in a tight grain housing device 175. The tight grain housing device 175 comprises a structure fixedly attached to the first side 40c or the second side 40d such that when the tight grain filter 250 is properly housed inside the tight grain housing device 175, the process water 2b must flow through the tight grain filter before being discharged through the basin exit port 60.

Figure 14:
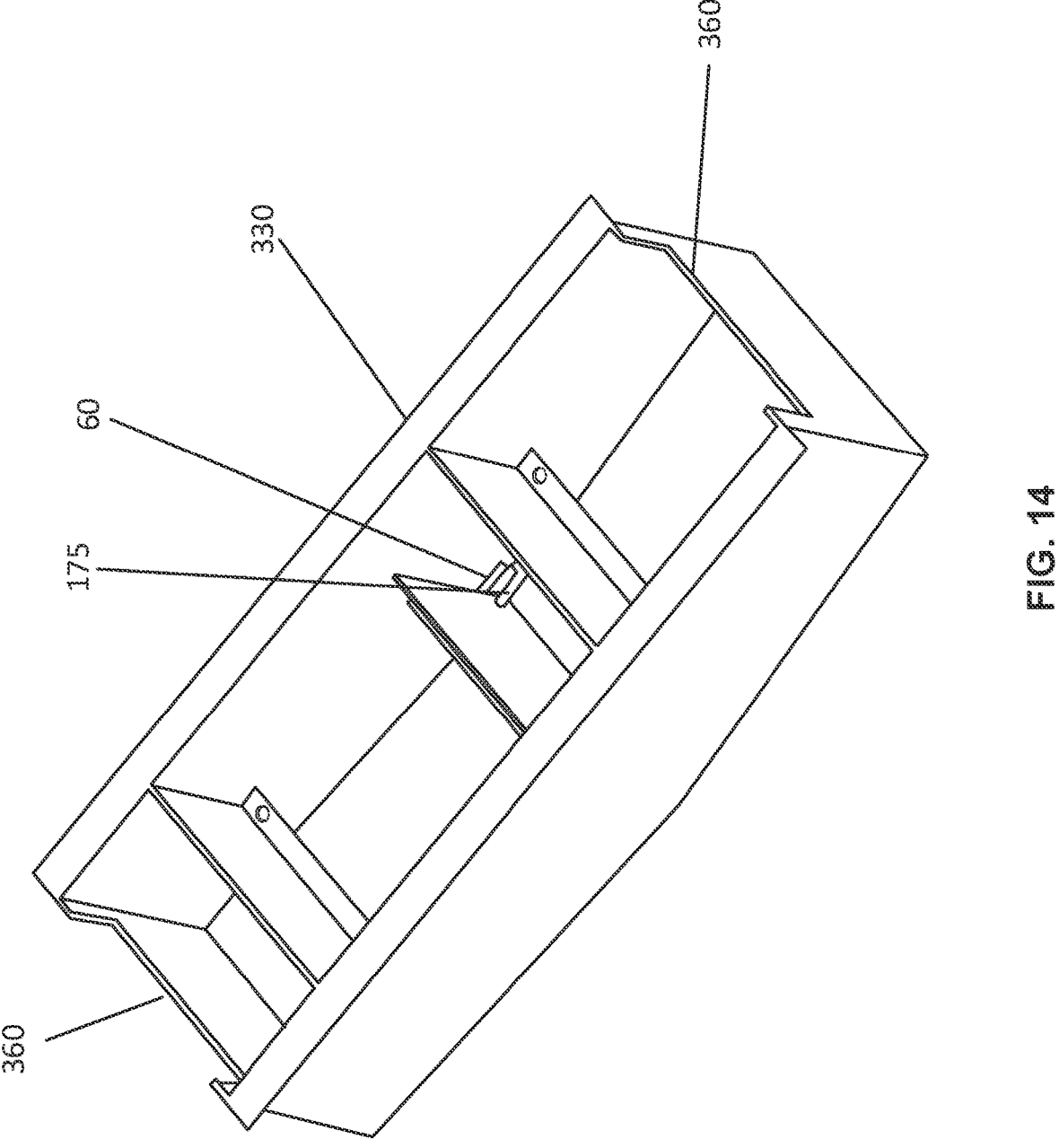
FIG. 14 is an isometric view of one embodiment of a basin 25.

The system 20 further comprises a discharge pipe 240 which is in fluidic communication with the basin exit port 60 and a surface water catch basin 242, as shown in FIG. 9. In some embodiments, the basin exit port 60 is located at the low point on the basin bottom surface 41. In other embodiments, shown in FIG. 14, the basin exit port 60 is located on the first side 40c or the second side 40d.

Figure 7:
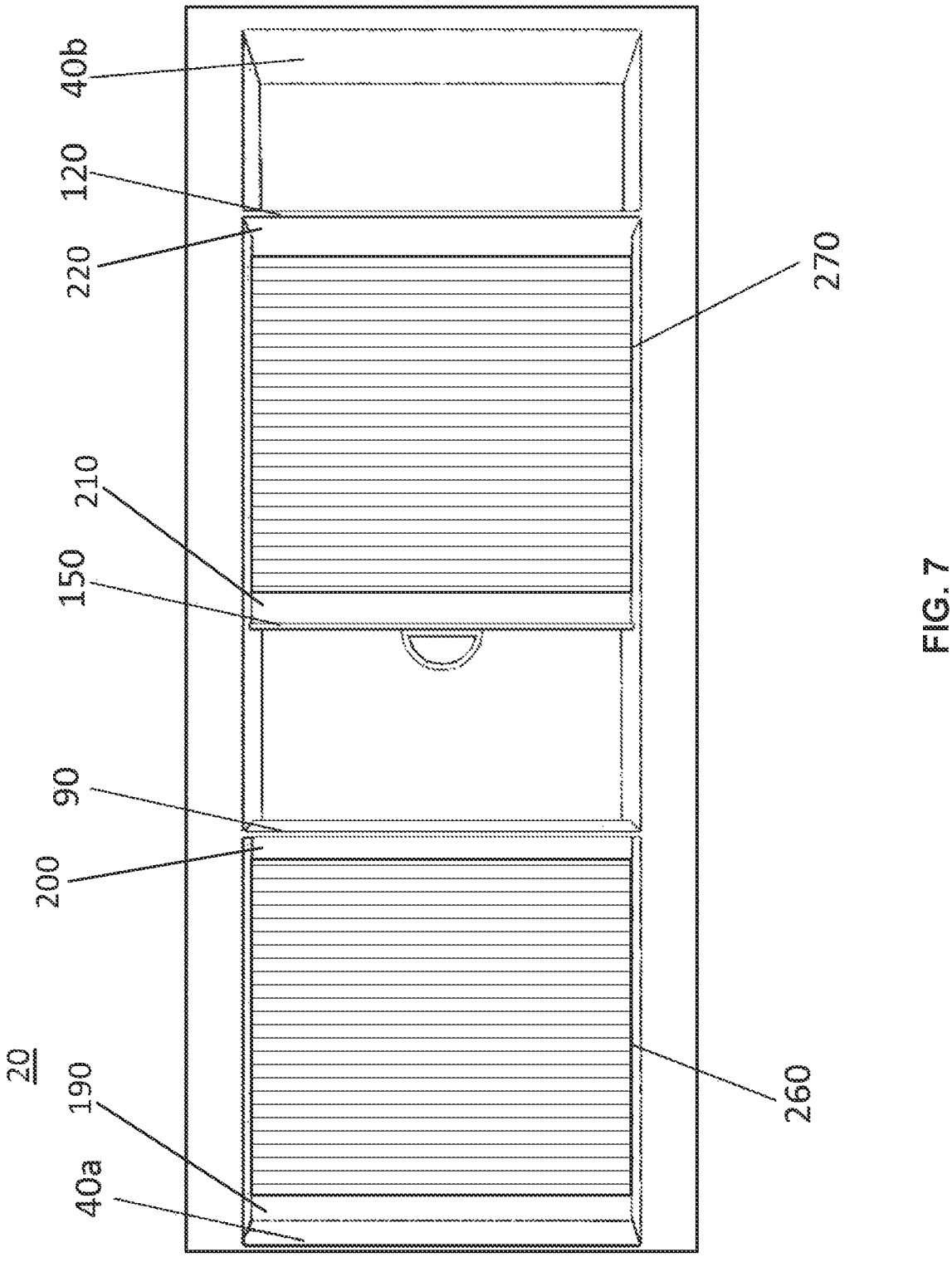
FIG. 7 is a top view of one embodiment of a basin 25.
Figure 8:
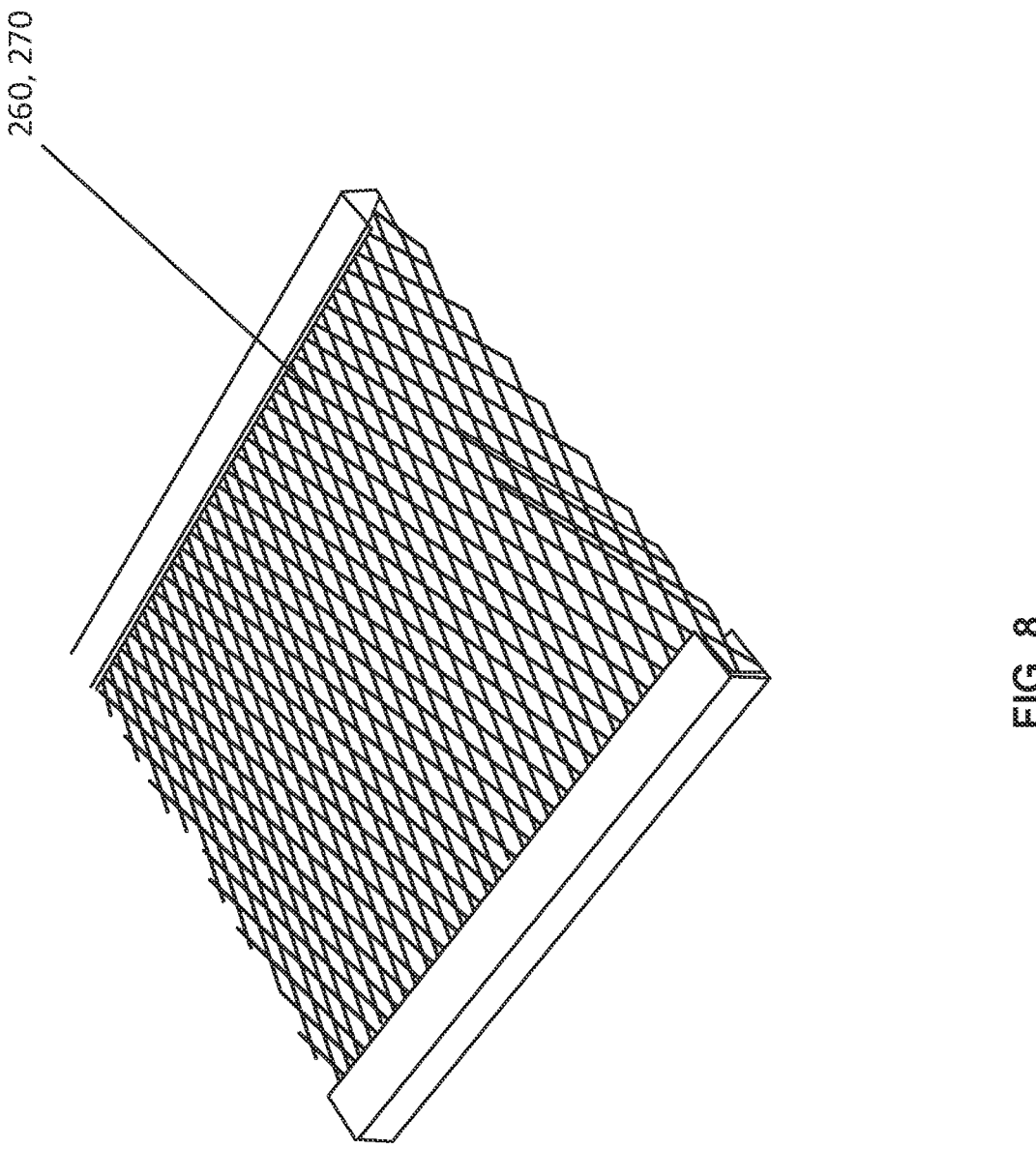
FIG. 8 depicts one embodiment of a filter mat.

In some embodiments, as shown in FIG. 7, the basin 25 further comprises a first water purification means comprising a porous structure configured to be positioned on top of the front side protrusion 70 and the first panel protrusion 100. In some embodiments, the basin 25 further comprises a second water purification means comprising a porous structure configured to be positioned on top of the second panel protrusion 130 and the third panel protrusion 160. In some aspects, the first and second water purification means can independently comprise a filter media. The filter media can be a filter mat. In some aspects, the system can comprise a first filter mat 260 and a second filter mat 270. FIG. 8 illustrates an embodiment of filter mat 260 and 270.

In some embodiments, the filter media can be selected from: activated carbon filter, catalytic carbon filter, KDF (Kinetic Degradation Fluxion), polypropylene foam, PVC foam, activated aluminum, manganese dioxide, or combinations thereof. In some embodiments, the KDF comprises copper and zinc particles. In some embodiments, the basin can further comprise one or a plurality of filter media balls. The filter media balls can comprise activated carbon, catalytic carbon, polypropylene, or polyvinylchloride. The filter media may be chosen based on site specific criteria and the pollutants that need to be removed from the contaminated surface water 2a. In some embodiments, different sequences of filter media can be used in sequential basins 25 to more efficiently remove pollutants from the contaminated surface water 2a.

As shown in FIG. 3, in some embodiments, the basin bottom surface 41 can taper towards a basin exit port 60. The opening in the basin exit port 60 can be cylindrical, ovular, square, or rectangular in shape. In some aspects, shown in FIG. 2, each of the bottom basin surfaces 41 can taper to a basin exit port 60 which is configured to allow liquid to traverse through the basin exit port 60 and along the direction of gravity. In some aspects, the third panel 150 can extend through the basin exit port 60. The basin exit port 60 can further comprise a tight grain filter 250, shown in FIG. 10.

Figure 10:
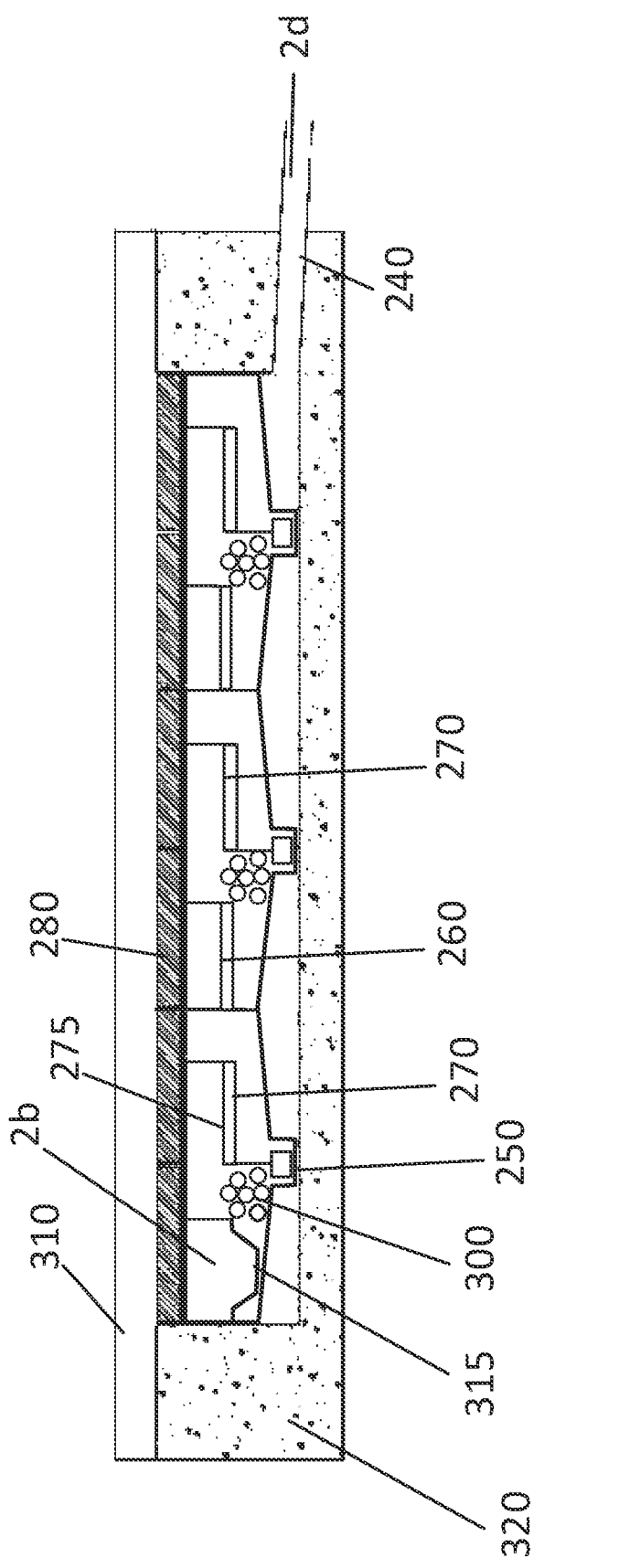
FIG. 10 is a side view of one embodiment of the surface water cleaning system 20.
Figure 11:
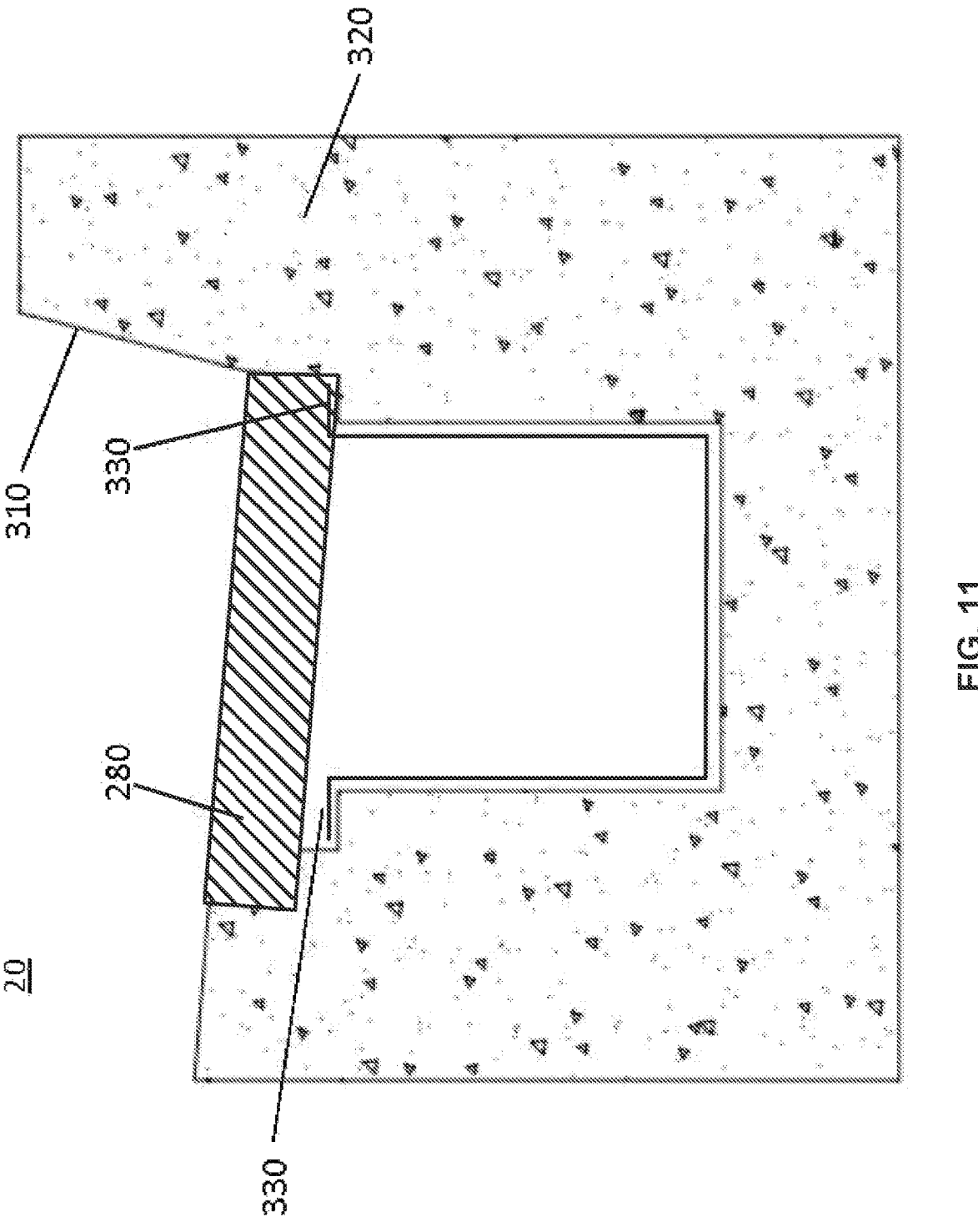
FIG. 11 is a side view of one embodiment of the surface water cleaning system 20.

FIG. 10 shows a side cutaway view of an alternative embodiment of the surface water cleaning system 20, including the relative configuration of an optional strainer device 315 for filtering large pollutants out of the cleaning system prior to reaching the filter mats, a first filter mat 260, a second filter mat 270, a filter mat housing 275, filter media balls 300, tight grain filter 250, slotted grates 280, concrete support 320, curb 310, discharge pipe 240, process surface water 2b, and drained cleaned surface water 2d. A side cutaway of the concrete support 320 is further shown in FIG. 11. The exterior protrusions 330, which begin from the first side 40c and the second side 40d at the top basin surface 30—shown in FIG. 4—and extend horizontally outward away from the basin, rest on the concrete support 320 adjacent to the curb 310. The purpose of the exterior protrusions 330 are to provide further support for the surface water cleaning system 20 within the concrete support 320. As shown in FIG. 11, in some embodiments, the grate 280, which may be slotted and made of steel, covers the top surface basin surface 30 in a sloping fashion such that the edge furthest from the curb 310 is higher/lower than the edge proximal to the curb 310.

Figure 12:
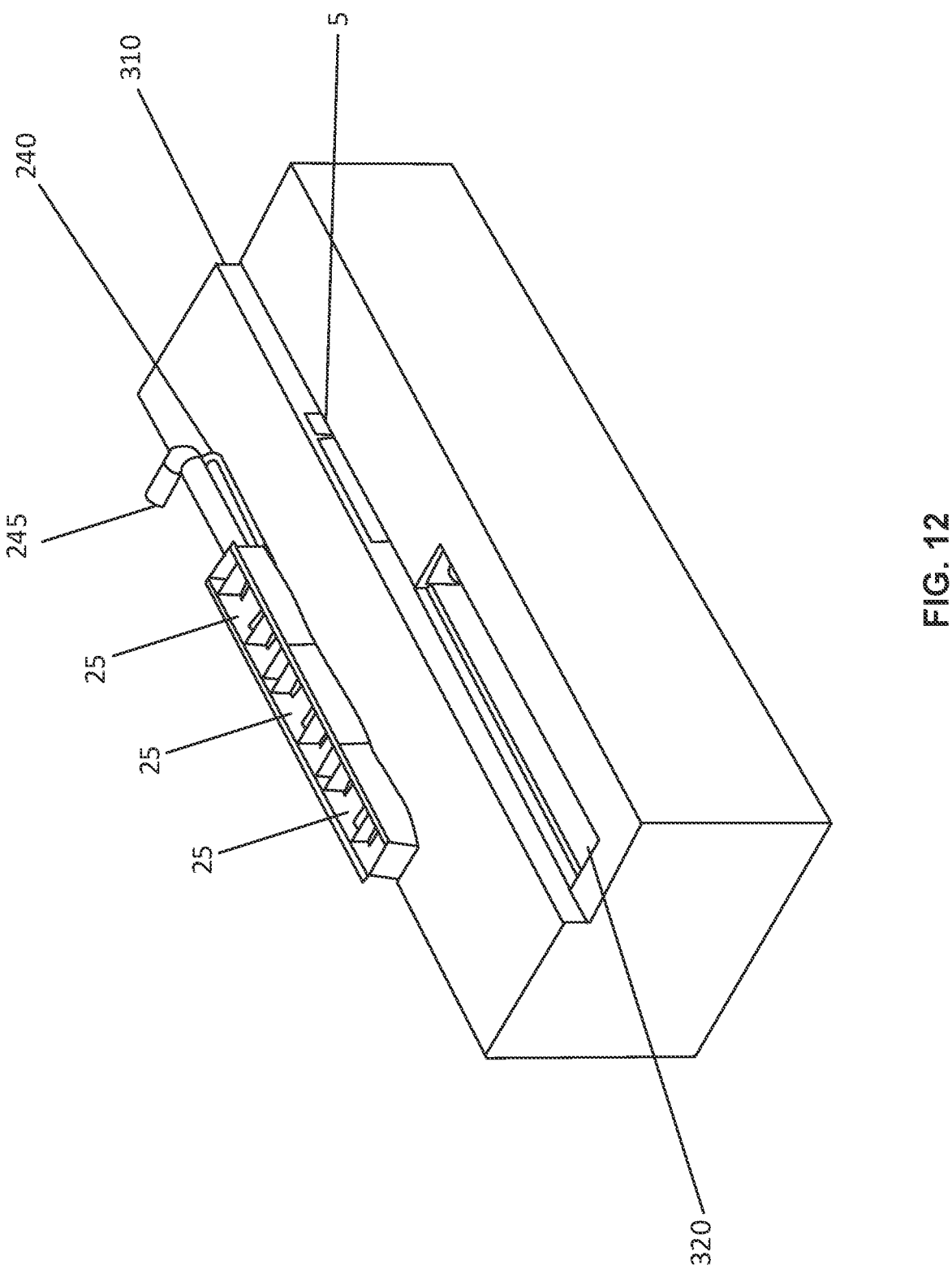
FIG. 12 is an isometric view of one embodiment of the surface water cleaning system 20.
Figure 13:
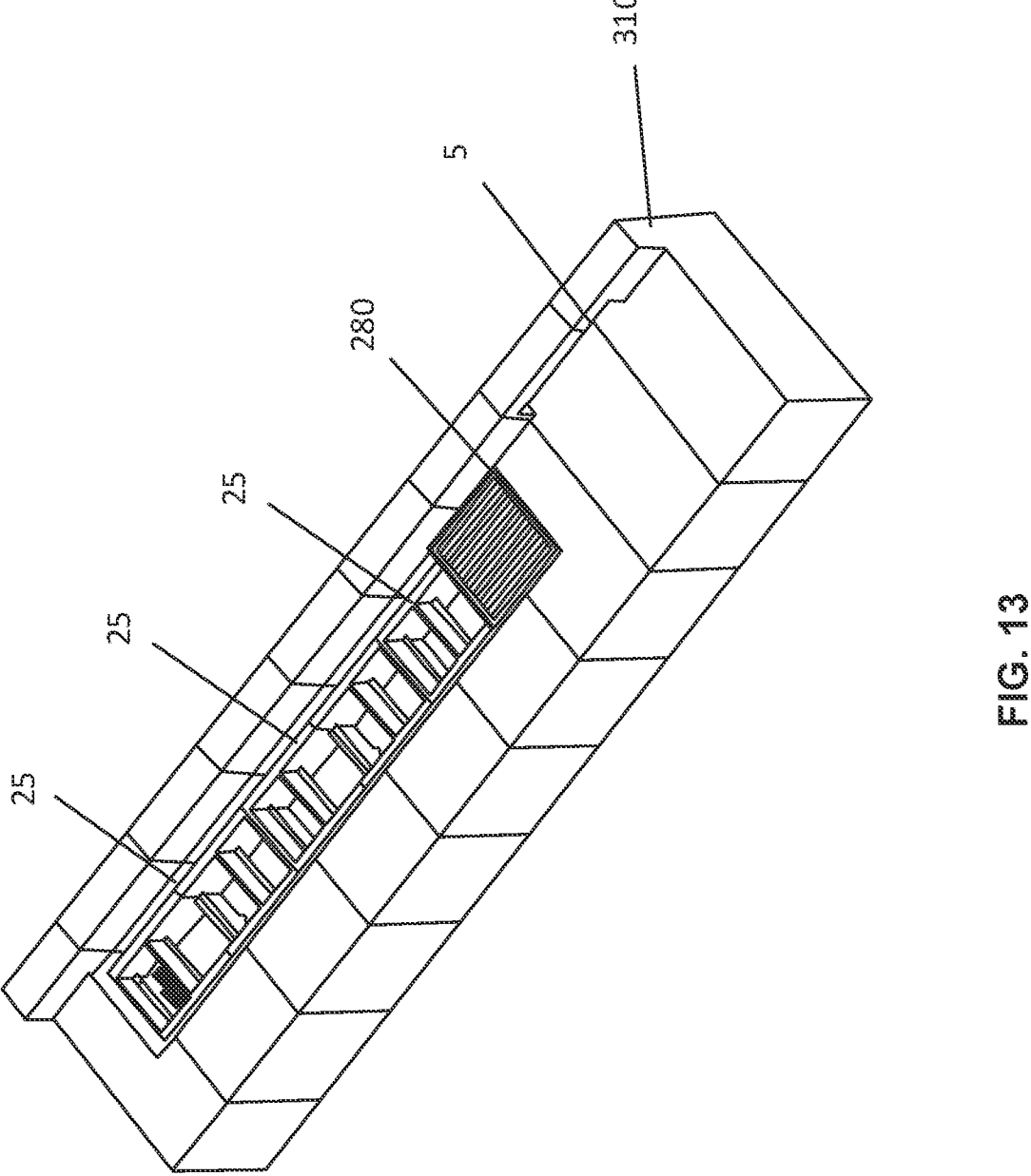
FIG. 13 is an isometric view of one embodiment of the surface water cleaning system 20.

FIGS. 12 and 13 show how multiple basins may be sequentially aligned along the gutter line of a curb 310 by placing the plurality of basins into a concrete support 320 proximal to the storm drain 5. In some embodiments, shown in FIG. 9 and FIG. 12 a discharge pipe 245 is attached to a main discharge port of the rear wall 40b of the most downstream basin 25 and the surface water catch basin 242 to allow for the processed surface water 2b to flow from the basin into the surface water catch basin 242. In some embodiments, shown in FIG. 13, the front side 40a and the rear side 40b each have a cutout 360 to lower the flow line through the surface water cleaning system 20. The lowered flow line allows the processed surface water 2b to flow from one basin to the next before the basin has filled to the top basin surface 30 with contaminated surface water 2a—creating an overflow scenario where the contaminated surface water bypasses the remaining basins and associated filter media resulting in the overflow cleaned surface water 2c flowing directly in to the storm drain 5.

Methods

Figure 15:
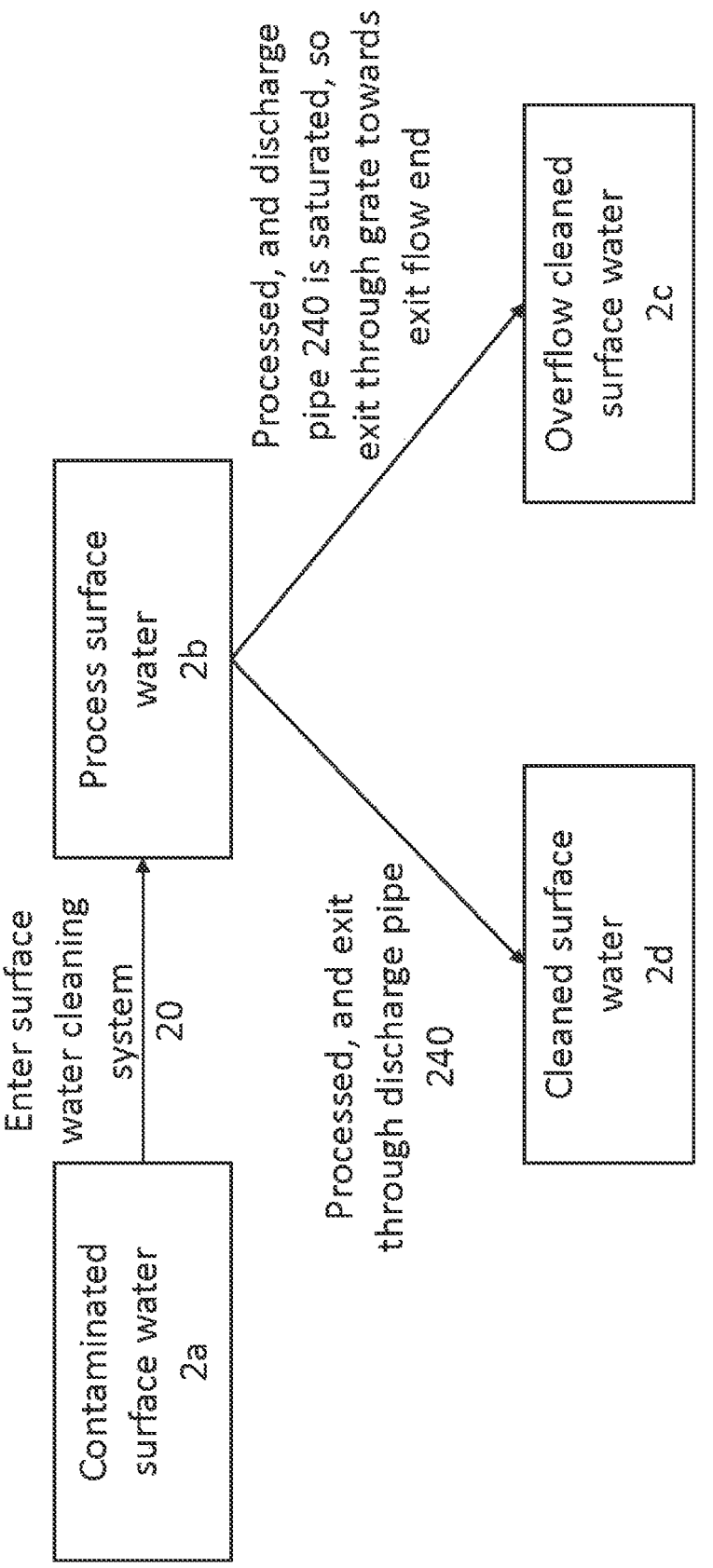
FIG. 15 shows a flow diagram of the steps by which contaminated surface water 2a is processed.

As depicted in the flowchart presented in FIG. 15, and an exemplary surface water cleaning system 20, contaminated surface water 2a enters the surface water cleaning system 20 through a grate 280 to become process surface water 2b. The incoming surface water flow is directed downward by gravity and is stopped from further horizontal movement when the water contacts the first panel 100. The water then traverses through a first filter mat 260, and optionally filter media balls 300. The water then traverses toward the bottom surface of the basin 41 and then traverses towards the single point in the direction of gravity 50 until it exits through the basin exit port. If the water flow is so high such that the water flow is saturated after traversing through the first filter mat, then excess water will enter a separate region of the grate and contact the second panel 120. After contacting the second panel, the excess water will traverse through a second filter mat 270 and optionally filter media balls 300, and then contact a separate region of the bottom surface of the basin 41. The water will then traverse towards the single point in the direction of gravity 50 until it exits through the basin exit port 60. The basin exit port is in fluidic communication with a discharge pipe 240, through which the water exits as cleaned surface water 2d and enters the street system catch basin (not shown). If the water flow rate is too high such that the discharge pipe 240 becomes saturated, then excess water will exit the basin either from the basin region defined by the distance between the first panel 100 and the third panel 150, or the region defined by the distance between the second panel 120 and the rear side of the basin 40b, forming overflow cleaned surface water 2c.

Figure 16:
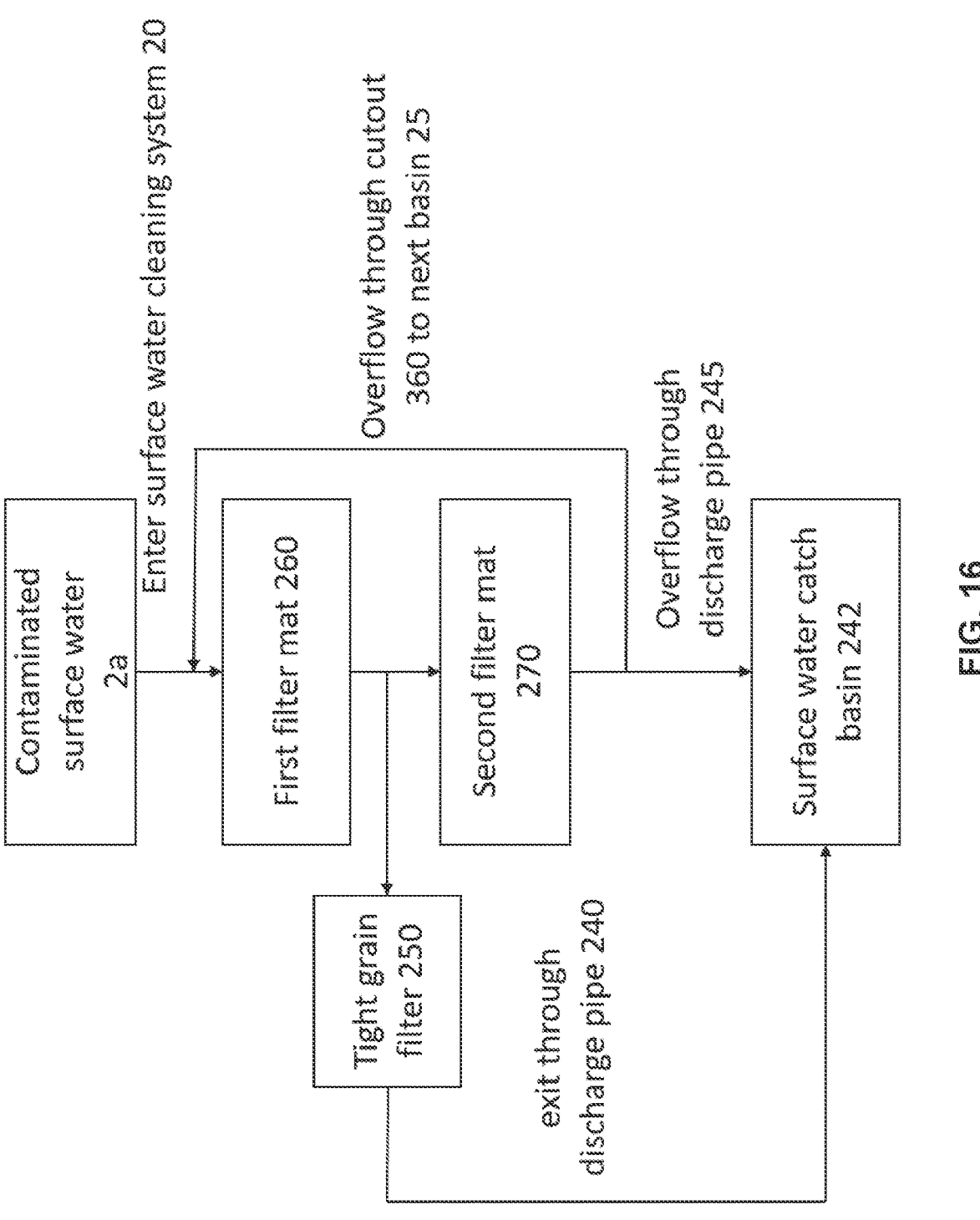
FIG. 16 shows a flow diagram of the steps by which contaminated surface water 2a is processed.

As depicted in the flowchart presented in FIG. 16, another exemplary embodiment of the surface water cleaning system 20, contaminated surface water 2a may enter the surface water cleaning system 20 through a grate 280 to become process surface water 2b. The incoming surface water flow is directed downward by gravity and is stopped from further horizontal movement when the water contacts the first panel 100. The water then traverses through a first filter mat 260, and optionally filter media balls 300. The water then traverses toward the bottom surface of the basin 41 and then traverses towards the single point in the direction of gravity 50 until it exits through the basin exit port 60. If the water flow is so high that the incoming contaminated surface water 2a flow exceeds the discharge flow of the basin exit port 60, then excess water will begin to flow over the top of the third panel 150, optionally through filter media balls 300, and then through the second filter mat 270. If the contaminated surface water 2a flow rate continues to exceed the basin exit port 60 discharge rate the process surface water 2b will eventually overflow through the cutout 360 and into the adjacent basin, as indicated by the arrows shown in FIG. 9.

Once the process surface water 2b enters the second basin, the water will then traverse towards the single point in the direction of gravity 50 through the second basin's first filter mat 260 until it exits through the basin exit port 60. The flow path through the second basin will be identical to the first, however, now the flow rate of the contaminated surface water 2a must exceed twice the basin exit port flow rate for the process surface water 2b to continue to rise. This flow pattern can continue for any number of sequentially aligned basin's 25 that may be needed, but for the sake of example, FIG. 9 illustrates an embodiment with three sequentially aligned basins 25. Accordingly, in this non-limiting example, when the flow process surface water 2b reaches the rear side 40b of the third basin, the process surface water 2b flows out the main discharge port, through the discharge pipe 245, and into the sewer system catch basin 242 resulting in cleaned surface water 2d. In some embodiments with more than three basins, additional basins 25 are added between the first and last basin shown in FIG. 9 to increase filter efficiency.

FIG. 9 further highlights the two distinct flow paths described above and illustrated in FIG. 15. The main flow path for the process water 2b is the overflow path through the cutout 360 between each basin 25 and then through the discharge pipe 245 in the rear side 40b in the last basin 25 in the aligned sequence of basins. The secondary path is through each of the basin exit ports 60 and through the discharge pipe 240 into the sewer system catch basin 242. The secondary flow path through the basin exit port 60 is designed for residual water that percolates through the tight grain filter 250. After a large storm there will be standing process water 2b in the basins that needs to be drained to prevent stagnation. The basin exit ports 60 may drain the process water optionally through the tight grain filters 250.

In some embodiments, when the surface water cleaning system 20 comprises a tight grain filter 250, water will traverse through the filter mats first, then be gated by the tight grain filter media until the water has traversed through the entire surface water cleaning system 20 and flow into the sewer discharge tank 242 through main discharge pipe 245 or overflow as cleaned surface water 2c and then flow into the sewer discharge tank 242. The tight grain filter 250 may be configured to control how much flow is directed to the main discharge pipe 245. In some embodiments, the tight grain filter 250 is configured to maximize flow to the main discharge pipe 245 while still allowing residual standing water in the basins 25 to drain in a reasonable time.

The light weight injection molded basin system is configured to be lightweight and removable by a single person with no special equipment. Additionally, there is no equipment required to remove the filter housing 275 and replace the depleted filter media 260/270. The present invention allows for simple, convenient maintenance and replacement of the surface water cleaning system 20.

It will be understood that the foregoing description is of exemplary embodiments of this invention, and that the invention is not limited to the specific forms shown. Modifications may be made in the design and arrangement of the elements without departing from the scope of the invention.

The inventions described and claimed herein have many attributes and embodiments including, but not limited to, those set forth or described or referenced in this Detailed Disclosure. It is not intended to be all-inclusive and the inventions described and claimed herein are not limited to or by the features or embodiments identified in this Detailed Disclosure, which is included for purposes of illustration only and not restriction. A person having ordinary skill in the art will readily recognize that many of the components and parameters may be varied or modified to a certain extent or substituted for known equivalents without departing from the scope of the invention. It should be appreciated that such modifications and equivalents are herein incorporated as if individually set forth. The invention also includes all of the steps, features, compositions and compounds referred to or indicated in this specification, individually or collectively, and any and all combinations of any two or more of said steps or features.

All patents, publications, scientific articles, web sites, and other documents and materials referenced or mentioned herein are indicative of the levels of skill of those skilled in the art to which the invention pertains, and each such referenced document and material is hereby incorporated by reference to the extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents. Reference to any applications, patents and publications in this specification is not, and should not be taken as, an acknowledgment or any form of suggestion that they constitute valid prior art or form part of the common general knowledge in any country in the world.

The specific methods and compositions described herein are representative of preferred embodiments and are exemplary and not intended as limitations on the scope of the invention. Other objects, embodiments, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of this, any of the terms "comprising", "consisting essentially of", and "consisting of" may be replaced with either of the other two terms in the specification. Also, the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also that as used herein and in the appended claims, the singular forms "a," "an," and "the" include plural reference unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adapted in a responsive writing by Applicants. Furthermore, titles, headings, or the like are provided to enhance the reader's comprehension of this document, and should not be read as limiting the scope of this. Any examples of embodiments, embodiments or components of the invention referred to herein are to be considered non-limiting.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although this has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any patient matter from the genus, regardless of whether or not the excised material is specifically recited herein.

Other embodiments are within the following claims. In addition, where features or embodiments of the invention are described in terms of Markush groups, those skilled in the art will recognize that the invention is also thereby described in terms of any individual instrument or subgroup of instruments of the Markush group.

The invention claimed is:

1. An apparatus for purifying contaminated surface water runoff comprising:
   an elongate open gutter;
   a first elongate removable basin having an open top and an outlet at a bottom thereof;
   a second elongate removable basin having an open top and an outlet at a bottom thereof;
      wherein, each of the first and second elongate removable basins is disposed within the elongate open gutter, in an end-to-end, linearly aligned fashion, each of the first and second elongate removable basins having at least one filter capable of reducing a concentration of contaminants in the contaminated surface water runoff, wherein the first elongate removable basin is fluidly coupled to the second elongate removable basin such that water flow unable to flow through the outlet of the first elongate removable basin may flow to the second elongate removable basin;

at least one grate enclosing the open tops of both the first and second elongate removable basins, the at least one grate preventing objects or solids above a certain size from entering the first and second elongate removable basins; and wherein, contaminated surface water runoff flows over the at least one grate and into the first and second removable basins, past the filter where contaminants are removed, with a purified water flowing through the outlets of the first and second elongate removable basins, and into the elongate open gutter, which is in fluid communication with a sewer system.

2. The apparatus of claim 1, wherein a bottom surface of each of the first and second elongate removable basins is sloped in a direction toward a respective outlet.

3. The apparatus of claim 1, wherein at least one of the first elongate removable basin and second elongate removable basin has opposing bottom surfaces sloped toward the outlet.

4. The apparatus of claim 1, wherein the elongate gutter is defined by concrete walls.

5. The apparatus of claim 1, wherein the at least one filter comprises a porous structure having pores sized to capture solid materials above a predetermined size.

6. The apparatus of claim 1, wherein the at least one filter comprises a strainer device.

7. The apparatus of claim 1, wherein the at least one filter comprises a filter mat.

8. The apparatus of claim 1, wherein the at least one filter comprises a filter media ball.

9. The apparatus of claim 1, wherein the at least one filter comprises a filter media selected from the group consisting of: activated carbon, catalytic carbon, KDF, polypropylene foam, PVC foam, activated aluminum, manganese dioxide, or combinations thereof.

10. The apparatus of claim 1, wherein the at least one filter comprises a comprises a filter media positioned in a filter housing.

11. The apparatus of claim 1, wherein the at least one grate comprises a first grate and a second grate and the first elongate removable basin is positioned below the first grate and the second elongate removable basin is positioned below the second grate.

12. The apparatus of claim 1, wherein the at least one filter forms a wall in each of the first elongate removable basin and in the second elongate removable basin.

13. The apparatus of claim 1, further comprising:

a third elongate removable basin having an open top and an outlet at the bottom thereof, the at least one grate enclosing the open top of the third elongate removable basin;

wherein the third elongate removable basin is disposed within the elongate open gutter; and wherein, the third elongate removable basin is fluidically coupled to the second elongate removable basin such that water flow unable to flow to the outlet of the second elongate removable basin may flow to the third elongate removable basin.

14. The apparatus of claim 13, wherein the third elongate removable basin comprises a first discharge pipe disposed between the third elongate removable basin and a sewer system.

* * * * *